March 26, 1957  A. D. ISHOY  2,786,560
CLUTCH AND BRAKE COMBINATION FOR POWER TRANSMISSION
SYSTEMS OF FARM TRACTORS. AND THE LIKE
Filed Aug. 7, 1953  6 Sheets-Sheet 1

INVENTOR.
A. D. Ishoy
BY
Attorneys

March 26, 1957  A. D. ISHOY  2,786,560
CLUTCH AND BRAKE COMBINATION FOR POWER TRANSMISSION
SYSTEMS OF FARM TRACTORS AND THE LIKE
Filed Aug. 7, 1953  6 Sheets-Sheet 2
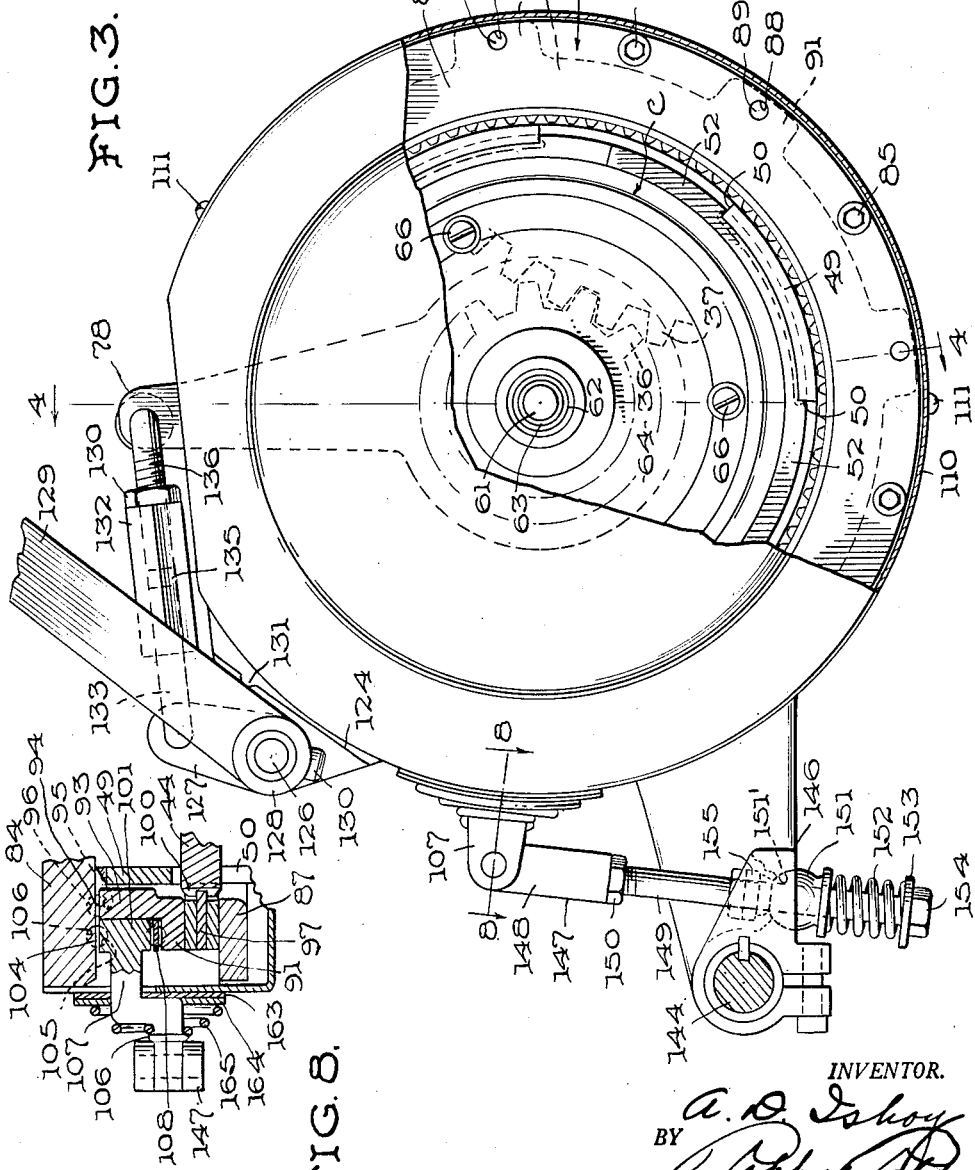
INVENTOR.
A. D. Ishoy
BY March 26, 1957 A. D. ISHOY 2,786,560
CLUTCH AND BRAKE COMBINATION FOR POWER TRANSMISSION
SYSTEMS OF FARM TRACTORS AND THE LIKE
Filed Aug. 7, 1953 6 Sheets-Sheet 3

INVENTOR.
A. D. Ishoy
BY
Robert Cobb
Attorneys

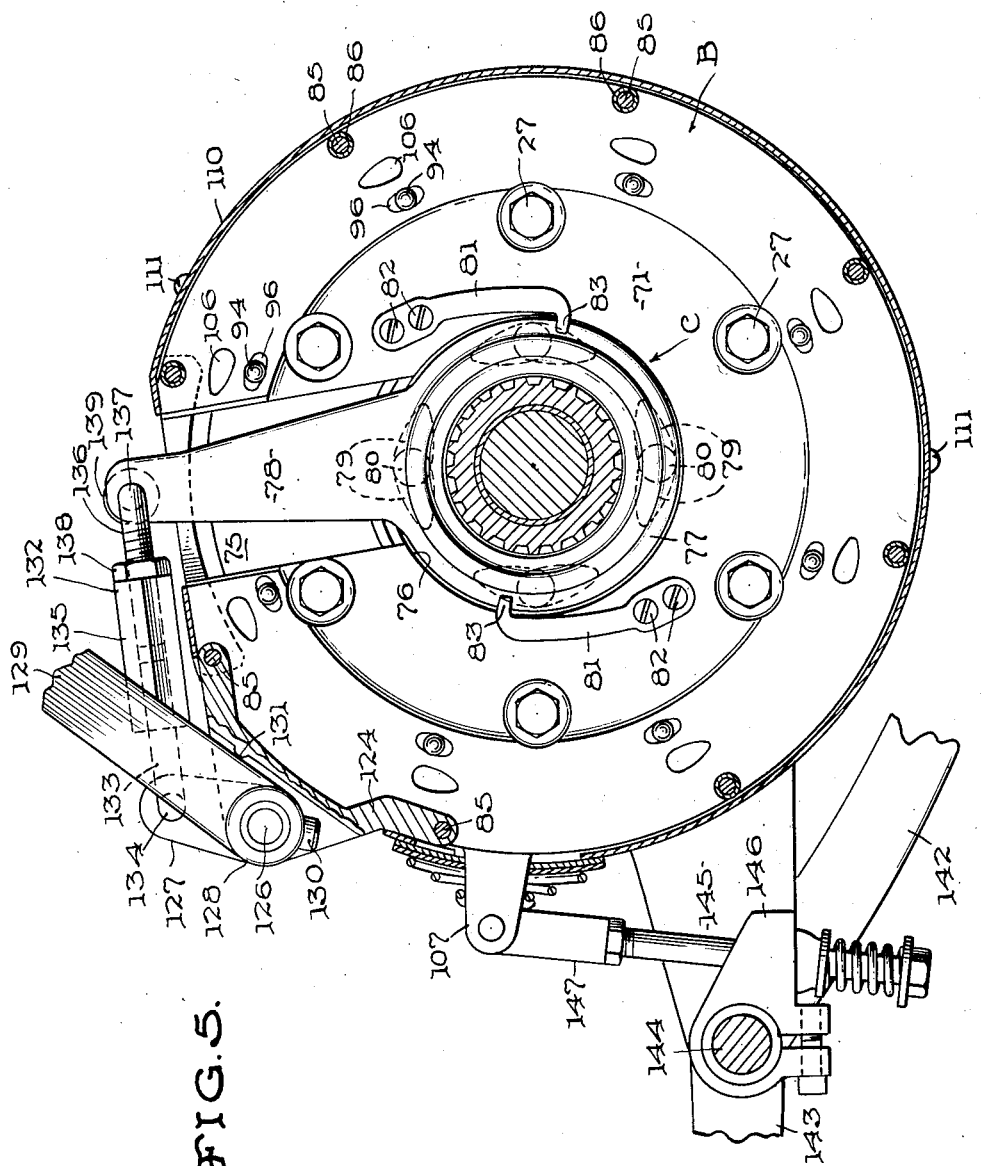

March 26, 1957 A. D. ISHOY 2,786,560
CLUTCH AND BRAKE COMBINATION FOR POWER TRANSMISSION
SYSTEMS OF FARM TRACTORS AND THE LIKE
Filed Aug. 7, 1953 6 Sheets-Sheet 6

INVENTOR.
A. D. Ishoy
BY Robb & Robb
Attorneys.

United States Patent Office 2,786,560
Patented Mar. 26, 1957

2,786,560

CLUTCH AND BRAKE COMBINATION FOR POWER TRANSMISSION SYSTEMS OF FARM TRACTORS AND THE LIKE

Albert D. Ishoy, Hartford, Mich., assignor, by mesne assignments, to Lambert Brake Corporation, St. Joseph, Mich., a corporation of Michigan Application August 7, 1953, Serial No. 373,022

19 Claims. (Cl. 192—18)

This invention relates to a clutch and brake combination, and more particularly to a clutch and brake combination which is adapted to be interposed between the source of power of a farm tractor or other motor vehicle and the traction wheels of the vehicle, so as to afford certain advantages in the operation thereof.

Most present-day farm tractors are provided with a power take-off which is operatively and selectively connected with the power input shaft of the power transmission system, by means of suitable gearing and a jaw clutch whereby when the main vehicle clutch and the power take-off jaw clutch are both engaged, the power take-off shaft will be driven irrespective of whether the change-speed gear assembly of the transmission system is in neutral or whether it is engaged so as to effect movement of the tractor. However, such a power take-off drive has the disadvantage of necessitating interruption of operation of the power take-off shaft when it is desired to change the operation of the change-speed gear assembly by either shifting gears to vary the gear ratio or by initiating or halting movement of the tractor.

Accordingly, it is a primary object of this invention to provide an auxiliary clutch assembly which is adapted to be installed in the power transmission system of a tractor, and which is operative to interrupt the drive to the traction wheels of the tractor, without requiring disengagement of the main clutch of the tractor, this auxiliary clutch being combined in a novel manner with a brake assembly which is operative to permit retarding of the tractor drive to at least one traction wheel when the clutch is engaged, and which is also operative to retard free rotation of at least one traction wheel when the clutch is disengaged.

Another object is to provide a clutch and brake combination which occupies a minimum of space from end-to-end, thereby rendering the same more readily applicable to installations having relatively small space allowances for the inclusion of such mechanisms.

In attaining the foregoing objectives, a countershaft having a hollow shaft coaxially and rotatably mounted thereon, is adapted to be operatively connected to the differential gearing of the tractor, so as to be driven by the differential. The hollow shaft, at one of its ends, is provided with a gear which is adapted to drive a bull gear on the axle of the tractor. The ends of the countershaft and the hollow shaft remote from the differential are provided with cooperatively engageable friction clutch elements which, when engaged, will effect the transmission of power from the differential through the countershaft and the hollow shaft to the aforesaid bull gear, and thus to the traction wheels of the tractor. In order to brake the hollow shaft, one of the cooperative clutch elements which is mounted on the hollow shaft for rotation therewith is provided with supporting means for a brake disc, this brake disc being rotatable with the supporting clutch element. Cooperative with this brake disc is a plurality of relatively stationary brake parts which serve to apply a braking action on the aforementioned disc.

By virtue of the foregoing arrangement or combination, the power take-off shaft of the tractor may be continuously operated irrespective of whether it becomes necessary to stop and/or start the tractor. Therefore, in certain farm operations, such as those performed by combine machines, hay balers or the like, if the elevator conveyors begin to jam or choke with the crop being gathered for threshing or baling, forward motion of the tractor may be stopped, while the power take-off continues to operate without interruption of the machine until the conveyor clears itself, and then forward motion may be resumed. On the other hand, if the tractor were not provided with means for preventing uninterrupted operation of the power take-off, the conveyors of the combine or baler would stop momentarily while the main vehicle clutch is disengaged and the change-speed gearing of the tractor is being shifted into a neutral position, and resumption of operation of the conveyor upon re-engagement of the main vehicle clutch may result in damage to the combine or baler conveyor, or in a drive belt of the machine being thrown, or other difficulties may arise from starting the choked up conveyor.

Another object is to provide a clutch and brake combination as aforesaid, which is adapted to be associated with the differential gear drive of a tractor, so as to be operative to brake the traction wheel at one side of the tractor, and to also provide an additional brake which is operative to brake the traction wheel on the other side of the tractor independently of the first-mentioned brake, thus affording steering brakes for facilitating use of the tractor.

A further object is to provide a novel clutch construction which includes an actuating disc having a substantially cylindrical sleeve or shell mounted at one of its ends on said actuating disc, said shell having at its other end a pressure plate, said actuating disc and shell being slidably and rotatably mounted and said pressure plate having a centering member carried thereby and rotatably and axially slidably mounted on a bearing support on a relatively rotatable member, whereby clutch squeal is eliminated.

Other objects and advantages will be described or will become apparent to those skilled in the art in the following detailed description of this invention, and the novel features thereof will be defined in the appended claims.

In the drawings:

Fig. 3 is a view in side elevation of the clutch and brake combination of this invention, with a portion of the housing broken away to disclose the interior construction thereof;

Fig. 5 is a view in vertical section, as taken on the line 5—5 of Fig. 4;

Fig. 8 is a fragmentary view in section, as taken on the line 8—8 of Fig. 3.

Like reference characters in the several views of the drawings and in the following description designate corresponding parts.

Figure 1:
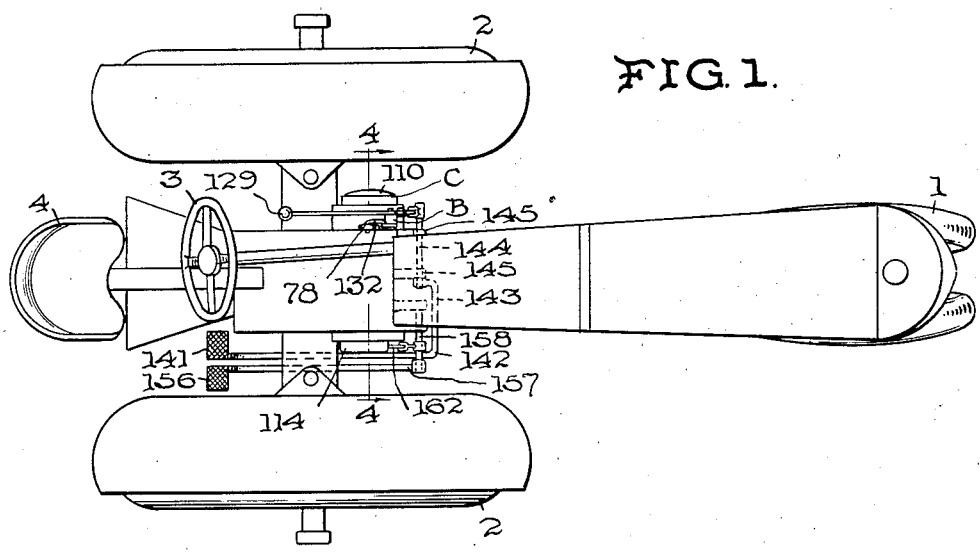
Fig. 1 is a top plan view of a conventional farm tractor having the instant invention applied thereto.
Figure 2:
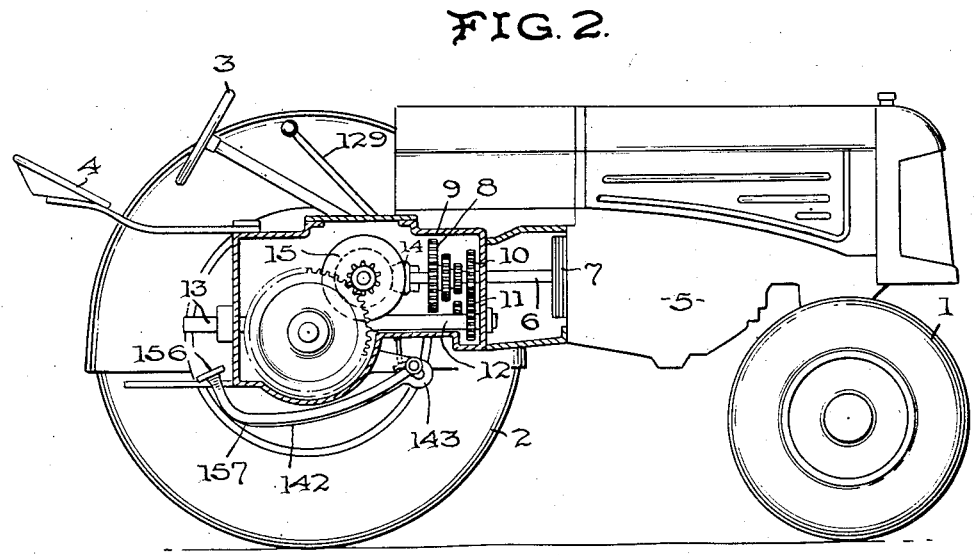
Fig. 2 is a view in side elevation of the tractor of Fig. 1, with one of the traction wheels omitted, and with other parts broken away and shown in section.

In Figures 1 and 2, there is shown a conventional farm tractor having steerable front wheels 1 and traction wheels 2 at the rear thereof. Steering of the tractor is effected by the conventional steering wheel 3 which is accessible from the operator's seat 4, and in addition, steering may be aided by braking the traction wheels 2 in a manner which will be hereinafter described.

The tractor is powered by an engine designated 5, said engine being operative to drive a drive shaft 6 through a main vehicle clutch 7. This clutch 7 is operative to establish and interrupt the drive from the engine 5 to the drive shaft 6 by means of suitable operating mechanism (not shown).

Connected to the drive shaft 6 so as to be driven thereby is the usual change-speed gear mechanism generally designated 8 which is mounted in a transmission case or housing 9 and which is controlled by the conventional gear shift mechanism (not shown).

Ahead of the change-speed gearing 8, the drive shaft 6 has a gear 10 mounted thereon for rotation therewith, this gear 10 being in mesh with a gear 11 on the forward end of a power take-off shaft 12 which extends through the housing 9 and projects rearwardly from the housing 9, as at 13, to provide a power take-off for driving auxiliary equipment which may be suitably connected to or drawn by the tractor.

The foregoing represents merely an illustrative tractor and power take-off arrangement, and it will be understood that conventional power take-off shafts are usually arranged in the same or in an equivalent manner, so as to be connected to a source of power ahead of the change-speed gear mechanism, and they are therefore not continuously operable, since release of the main clutch 7 will interrupt operation of the power take-off.

Adapted to be driven by the transmission gearing 8 is a pinion gear 14 which is in mesh with a beveled ring gear 15 of a differential gear assembly. The differential includes a generally cylindrical housing 16 to which the ring gear 15 is secured, and a pinion 17 is rotatably mounted within the differential housing 16. At each of its opposite ends, the differential housing is provided with an axially extended, annular flange 18 having axially aligned openings leading into the housing 16. A countershaft 19 extends through the opening in one end of the housing 16, this shaft 19 having a splined end 20 on which is mounted a beveled gear 21 which is in mesh with the pinion 17 (see Fig. 4). A second countershaft 22 extends through the opening in the other end of the differential housing 16, and this shaft 22 also has a splined end 23 on which is also mounted a beveled gear 24, thus completing the differential gear assembly (see Fig. 4a).

Projecting through an opening in one side of the transmission case 9 is an axially extended hollow bearing cage 25 having a radial flange 26 secured to the outside of the case 9 by means of a suitable number of screws 27. At the inner end of the bearing cage 25, it is formed with a bearing seat 28 in which is seated the outer race of an anti-friction bearing 29, and the inner race of this bearing 29 seats on the annular flange 18 at the contiguous side of the differential housing 16, so as to rotatably support this end of the housing 16.

Likewise projecting through an opening in the other side of the transmission case 9 is a similar bearing cage 30 having a radial flange 31 secured to the outside of the transmission case by a suitable number of screws 32. At the inner end of the bearing cage 30, it has a bearing seat 33 in which is seated the outer race of an anti-friction bearing 34, while the inner race of this bearing seats on the flange 18 at this side of the differential housing 16.

Figure 4:
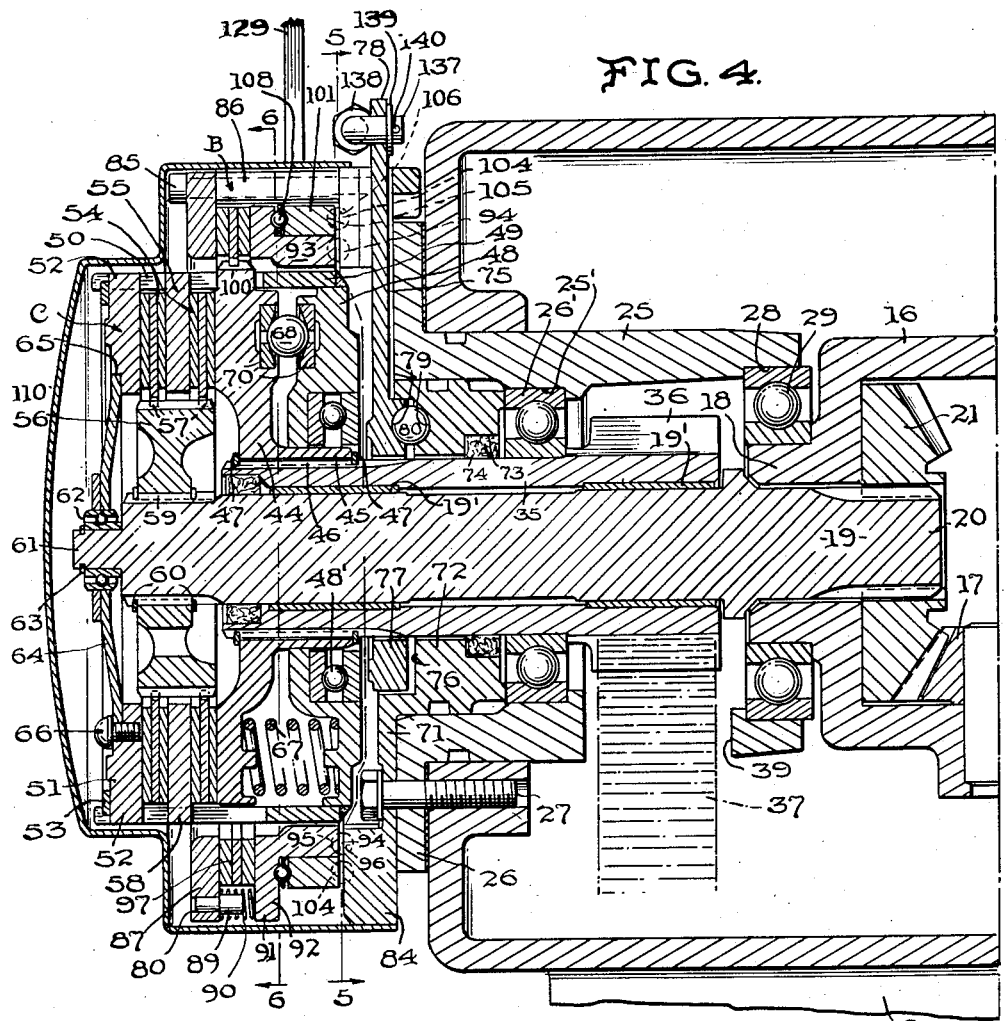
Fig. 4 is a partial view in vertical section, as taken on the line 4—4 of Figs. 1 and 3, with certain of the parts shown in elevation, and showing the clutch and brake combination mounted at one side of the tractor differential.

As is seen in Fig. 4, the countershaft 19 is coaxially disposed relative to and extends through the bearing cage 25, and a hollow shaft 35 is coaxially and rotatably mounted on the countershaft 19 by means of a pair of bearings 19', with one end of the hollow shaft projecting into the bearing cage 25. Intermediate its ends, the bearing cage 25 is formed with a seat 25' in which is seated an anti-friction bearing 26', and the hollow shaft is journaled in this bearing 26'. The inner end of the hollow shaft 35 is formed with a pinion gear 36 adapted to mesh with a bull gear 37 which is carried by an axle 38 for driving one of the traction wheels 2, the bearing cage 25 being provided with an arcuate opening or slot 39 through which the bull gear 37 extends for engagement with gear 36.

Clutch means generally designated C in Fig. 4 are provided for selectively establishing or interrupting rotation of the hollow shaft 35 with the countershaft 19 when the latter is being driven by the differential gearing, and when the clutch C is engaged so that the hollow shaft 35 is revolving, power will be transmitted through the bull gear 37 to the traction wheel on the left-hand side of the tractor.

Figure 9:
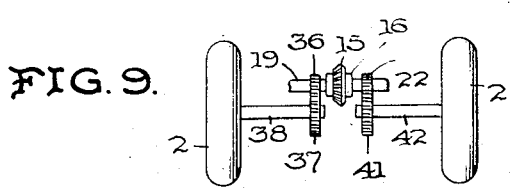
Fig. 9 is a view on a reduced scale, showing schematically the gear drive between the traction wheels and the differential assembly of the tractor.
Figure 4A:
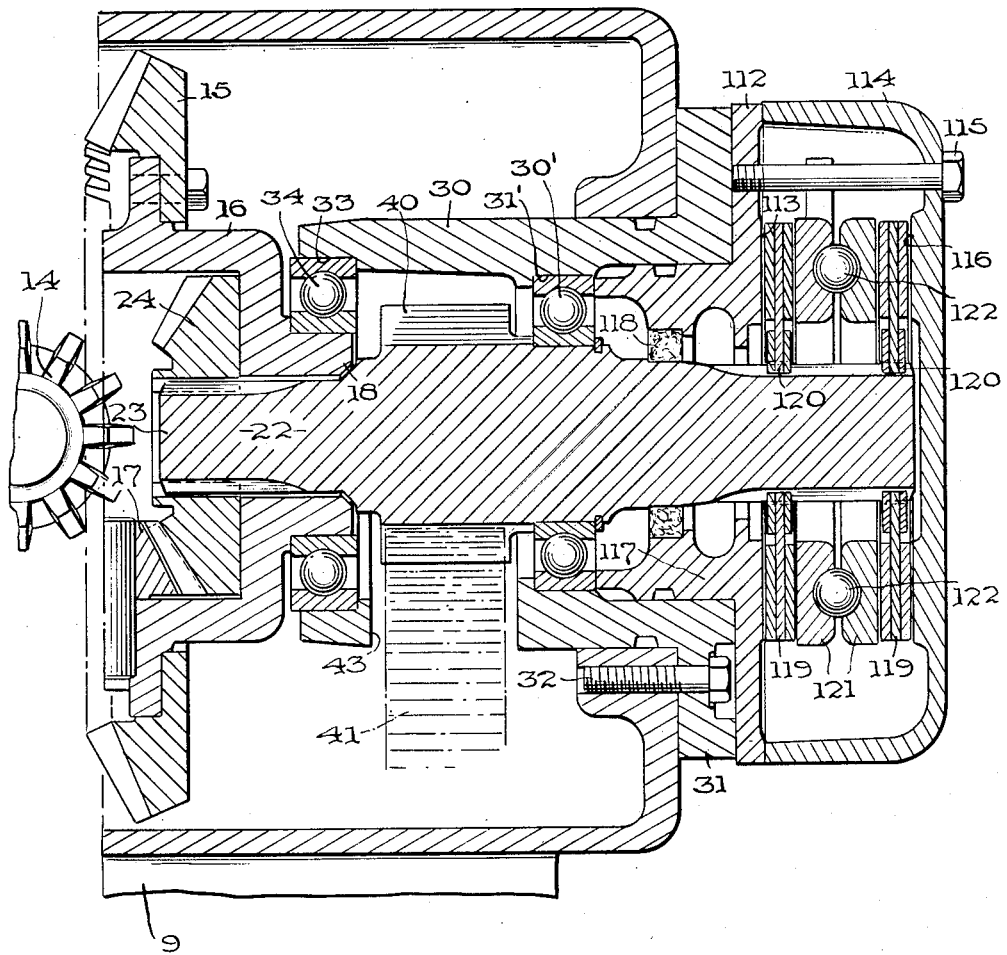
Fig. 4a is a partial view in vertical section, as taken on the line 4—4 of Figs. 1 and 3, with certain of the parts shown in elevation, and showing another brake mounted at the other side of the tractor differential, this view being a continuation of Fig. 4.

On the other side of the differential, as seen in Fig. 4a, the countershaft 22 is coaxially disposed in the bearing cage 30 and is mounted in an anti-friction bearing 30' which is seated in a seat 31' in the cage 30. Inwardly of the bearing 30' the countershaft 22 is formed with a gear 40 which meshes with a bull gear 41, this bull gear 41 being mounted on an axle 42 which is drivingly connected to the other traction wheel 2, that is, the traction wheel on the right-hand side of the tractor, as seen in Figs. 1 and 9, said bearing cage 30 being recessed or slotted as at 43 to permit engagement of gear 40 with bull gear 41. Therefore, when clutch C is engaged, the differential gear assembly also drives the bull gear 41 and consequently the traction wheel on axle 42.

The aforementioned clutch C includes a generally annular power plate 44 having an interiorly splined central hub 45, the splines of which engage with mating splines on the outer end of hollow shaft 35, as at 46, so that the power plate 44 is rotatable with the hollow shaft 35, and snap rings 47 suitably seated about the splined end of the hollow shaft 35 at opposite ends of the hub 45 secure the power plate against axial movement.

Figure 6:
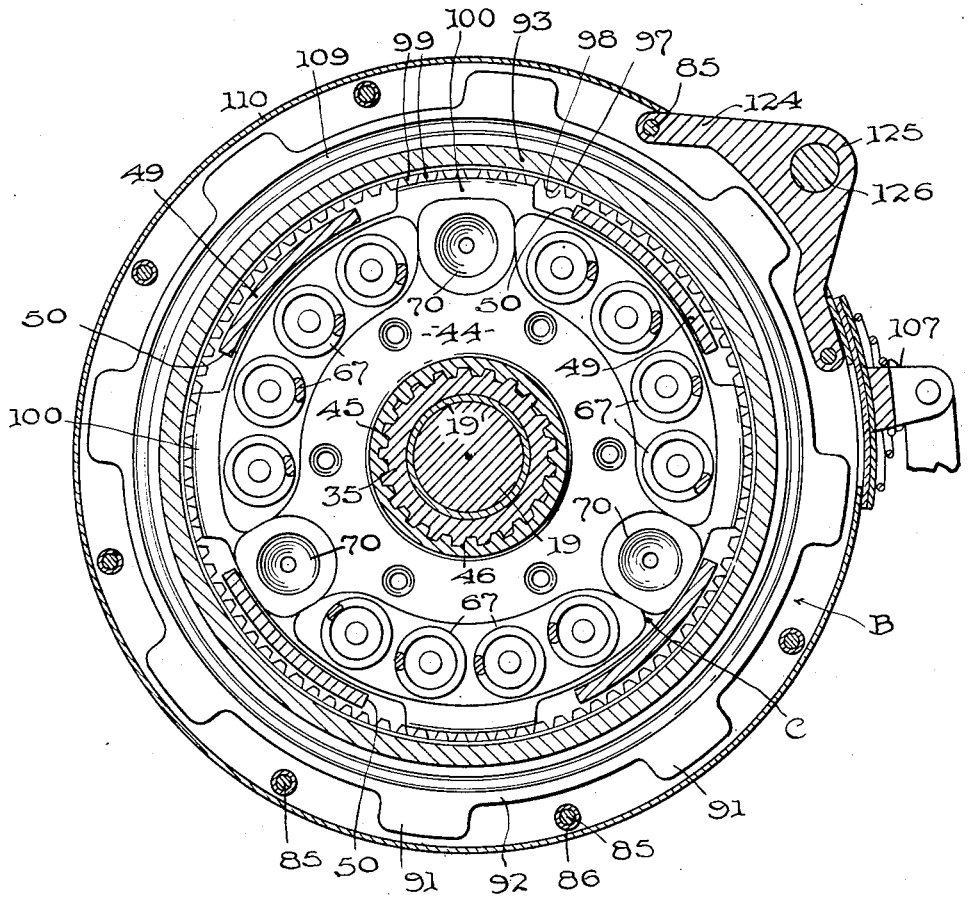
Fig. 6 is a view in vertical section, as taken on the line 6—6 of Fig. 4.

Slidably and rotatably mounted on the hub 45 of power plate 44 is a primary actuating disc 48 of generally annular form, and suitably and rigidly mounted at one of its ends about the outer periphery of the disc 48 is an axially extended, cylindrical shell 49. The other or free end of the shell 49 is castellated or formed with a plurality of circumferentially spaced, axially extended open slots 50, and as seen in Fig. 6, there are preferably four such slots.

At the side of the power plate 44 opposite the primary actuating disc 48 and adjacent to the free end of the shell 49, there is a secondary clutch disc or pressure plate 51, also of annular form, which is disposed within the shell 49 and is provided with a plurality of radially extending lugs or projections 52 which engage in the slots 50 of shell 49 so as to mount the pressure plate 51 in the shell 49 for rotation with the latter. A locking ring 53 is seated about the inner periphery of the shell at the outer side of the pressure plate 51, so as to secure the plate 51 against axial movement out of the shell.

Interposed between the opposed faces of the power plate 44 and the pressure plate 51 is a plurality of interleaved, annular friction discs 54 and 55, the illustrative embodiment showing a pair of discs 54, with a single intermediate disc 55. These friction discs 54 and 55 are respectively axially and slidably mounted or or carried by an annular hub member 56 and the shell 49, the hub member 56 having a splined outer periphery with which is engaged the splined inner periphery of the discs 54, as at 57, and the disc 55 having a plurality of radially projecting lugs 58 which extend into the slots 50 in the shell 49. The hub 56 which carries the discs 54 is mounted on the countershaft 19, as at 59, by means of complemental splines on its inner periphery and on the countershaft 19, and the hub 56 is secured against axial movement by a pair of locking rings 60 at opposite sides of the hub.

At the outer end of the countershaft 19, it is formed with a relatively small axial projection 61 on which is mounted an anti-friction bearing 62, this bearing being secured against displacement by a snap ring 63 seated in a groove about the periphery of the extension 61. Slidably mounted on the bearing 62 is an annular bearing plate or support 64 of dish-like form, and the outer marginal edge of the plate 64 is mounted in an annular seat 65 in the side wall of the pressure plate 51, with a suitable number of screw fasteners 66 locking the plate 64 to the pressure plate 51, thus providing a rotatable and axially slidable support for the inner periphery of the pressure plate. This supporting means for the disc 51 completely eliminates undesirable squeal when the clutch C is being engaged.

The clutch C is engaged by shifting the pressure plate on secondary actuating disc 51 towards the power plate 44 so as to pack the friction discs 54 and 55 therebetween, and to accomplish this, a plurality of coiled clutch-engaging springs 67 are interposed between the power plate 44 and the primary actuating disc 48, these springs acting to shift the primary disc 48 axially away from the relatively stationary power plate 44, and the primary disc 48 and the shell 49 thus shifting the pressure plate or secondary discs 51 towards the power plate 44.

Also interposed between the power plate 44 and the primary disc 48 is a plurality of hardened balls 68, the opposed faces of the plate 44 and the disc 48 being provided with inserts 70 in which the balls 68 are seated, these inserts having conical depressions providing oppositely inclined camming surfaces on which the balls 68 ride to effect self-energization of the clutch responsive to load on the clutch tending to cause the power plate 44 to lag behind the primary disc 48 when the hollow shaft 35 is being driven by the countershaft 19, as will be hereinafter more fully described.

Means for releasing the clutch are provided, and in this connection, a clutch release backing plate 71 is secured to the flange 26 of bearing cage 25 and is formed with an axially offset hollow hub 72 which projects into the bearing cage 25 so as to be centered therein in slightly spaced relation to the hollow shaft 35 which extends therethrough. Preferably, the portion 72 of the backing plate 71 is provided about its inner periphery with a seat 73 in which a sealing element 74 is placed for engagement with the hollow shaft 35 to prevent the flow of lubricant along the outside surface of hollow shaft 35 from the transmission case into the clutch assembly.

At one side thereof, the backing plate 71 is provided with a generally radially but slightly inclined recess or slot 75, and about its inner periphery at the end of the portion 72 opposite the seal 74, the backing plate 71 is formed with a circular recess 76 opening into the slot 75. Concentrically mounted in the recess 76 is an annulus 77 having a laterally projecting arm 78 formed integrally therewith, this arm 78 being disposed in the slot 75 in the backing plate 71 and extending out of the same, so as to be manipulated by mechanism which will hereinafter be described. Interposed between the annulus 77 and the backing plate 71 and seating in opposed, oppositely inclined ramped seats 79 in these members, is a plurality of hardened balls 80 which are adapted to shift the annulus 77 axially toward the primary disc 48 and into engagement with a thrust or throw-out bearing 48' which is carried by primary actuating disc 48, when the annulus is rotated slightly in one direction. A pair of leaf springs 81 (see Fig. 5) are secured to the backing plate 71, as by means of screws 82, and each spring 81 has an offset end 83 which projects into overlying engagement with the annulus 77 so as to maintain the annulus resiliently biased into the recess 76 in plate 71 and against the balls 80.

Extending around the outer marginal edge of the backing plate 71, there is an axially extended, enlarged flange 84 which provides a backing or power plate portion for a brake assembly designated B.

Secured to the flange portion 84 of backing plate 71 by means of a plurality of circumferentially spaced screws 85 and maintained in spaced relation to the flange 84 by cylindrical spacers 86 on the screws 85, is a secondary, stationary brake disc 87 of annular form, this brake disc 87 encircling the clutch C in spaced relation thereto. Intermediate the screws 85, the brake disc 87 is formed with a plurality of recesses 88 in each of which is seated a stem or shank of a spring-centering and supporting pin 89, and located on these pins 89 is a like number of coiled springs 90.

These springs 90 act upon the outboard face of a plurality of radial projections 91 on the outer periphery of a primary brake disc 92, so as to normally urge the primary disc 92 away from the secondary disc 87. The primary brake disc 92 is of annular form and also encircles the clutch C, and at its inner margin, the disc 92 is provided with an axially extended collar 93 which projects into close proximity to the flange 84 on the backing plate 71. Interposed between the collar 93 and the flange 84 are a plurality of hardened camming balls 94, the opposed faces of the collar 93 and the flange 84 respectively having recesses 95 and 96 in which the balls 94 are seated, and which provide oppositely inclined ramps on which the balls 94 may act to effect self-energization of the brake B, as will be hereinafter more fully described.

Interposed between the primary and secondary brake discs 92 and 87, there is an intermediate brake disc 97, preferably having friction lining material on its opposite side faces. This brake disc 97 is also of annular form and encircles the clutch C, and about its inner periphery, the disc 97 is provided with splines 98 adapted to engage with splines 99 on the ends of a plurality of radially projecting lugs or supports 100 which are formed on the outer periphery of the clutch power plate 44, these lugs 100 extending through the slots 50 in the clutch shell 49, as is seen in Figs. 4 and 6.

Thus, brake disc 97 constitutes a rotary member to be braked and is carried by a portion of the clutch C, and braking of the disc 97 and consequently the clutch power plate 44 will effect braking of the hollow shaft 35, irrespective of whether the clutch C is engaged or disengaged.

In order to selectively engage the brake or release the same, an annular brake actuator ring member 101 is rotatably mounted on the outer periphery of the collar 93 on primary brake disc 92, with a plurality of brake-actuating balls 104 interposed between the ring 101 and the flange 84 on the backing plate 71, these balls 104 also seating in opposed ramped seats 105 and 106 in the ring 101 and the flange 84, respectively (see Fig. 8, particularly).

At one side of the ring 101, it is formed with a radially projecting arm 107 which is adapted to be operated by mechanism which will hereinafter be described, for rotating the ring 101, whereby a camming action of the balls 104 will effect axial movement of the ring 101 away from flange 84 to engage the brake B.

Interposed between the ring 101 and the primary brake disc 92, there is an anti-friction ball bearing assembly 108, the balls of which are adapted to freely ride in an annular raceway 109 in brake disc 91 and in a similar raceway in the contiguous face of the ring 101. Thus, friction which might otherwise interfere with efficient or easy operation or energization of the brake B is eliminated.

A housing 110 for the combined clutch and brake C, B is provided, and preferably in the form of a circular shell which is open at one end, so as to be applied over the inner assembly and closely surround the same and generally conform to the contours of the assembly. This housing is preferably relatively close-fitting about the outer periphery of the backing plate 71 and is secured thereto by a suitable number of screw fasteners 111. The housing 110 is provided with suitable openings through which the clutch operating arm 78 and the brake operating arm 107 may project, and in addition, the housing 110 is provided with an opening through which extends a portion of a mechanism for shifting the clutch arm 78, as will be hereinafter more completely described.

Obviously, the brake B is only operative to brake one side of the tractor, since it operates only on the hollow shaft 35 and will therefore control only axle 38, while axle 42 on the other side of the tractor will continue to be driven through the differential, or will be free to rotate if the clutch C is disengaged.

Accordingly, in order to obtain the optimum advantage of the combination clutch and brake C, B for steering purposes, a second brake is provided for operation on the countershaft 22 which transmits power to the pinion 40 and the bull gear 41. Such a second brake is generally shown in Fig. 4a as including a two-part housing having an inboard plate 112 providing a stationary braking surface 113, and an outboard shell 114 which is secured to the plate 112 by a suitable number of screws, such as that at 115, this shell 114 providing a second stationary braking surface 116 in opposed, axially spaced relation to surface 113.

For purposes of sealing the brake housing 112, 114 against the entry of lubricant along the countershaft 22, the plate 112 is formed with an axially extended hub 117 which is provided with a sealing element 118.

Disposed within the housing 112, 114 is a pair of brake discs 119, 119 which are slidably connected, as by a splined connection 120, to the countershaft 22 for rotation therewith and for axial shifting movements into and out of engagement with the friction surfaces 113 and 116. Disposed between the braking discs 119, 119 is a pair of actuating discs 121, 121 having a plurality of energizing balls 122 therebetween. This brake assembly as a whole is well known and is the subject matter of U. S. Patent No. 2,387,039, dated October 16, 1945, to which reference may be made for the specific details of construction and operation, and therefore, this brake need not be further described in the present application, particularly, since it is merely illustrative of one specific form of brake which might be and preferably is utilized. Suffice it to say that a slight rotation of the discs 121 will effect operation of the brake to selectively brake or release the countershaft 22, and such brake operation is effected by a pair of toggle links (not shown) which are operated by mechanism which will hereinafter be described.

In order to actuate the clutch C, the brake B, and the second brake just mentioned, suitable operating mechanism is provided.

Figure 7:
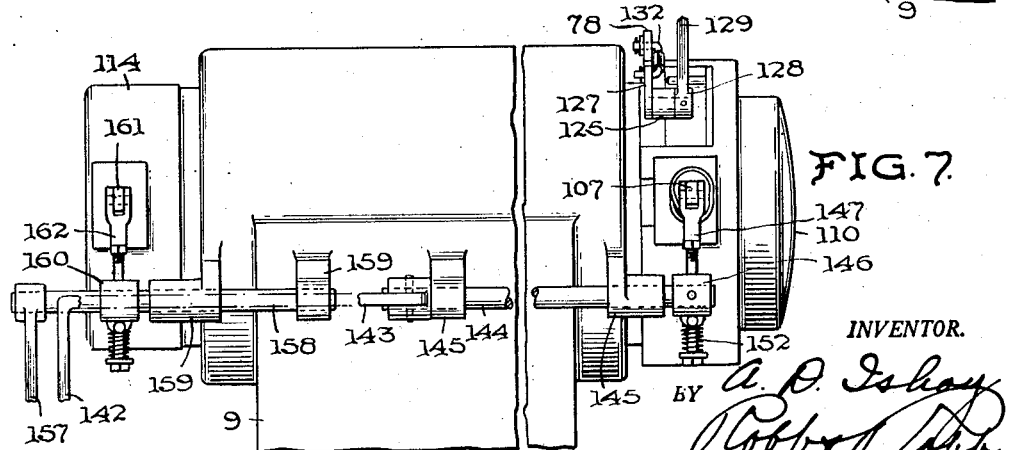
Fig. 7 is a view in front elevation of the transmission case of the tractor, with the clutch and brake combination shown installed thereon, and showing the operating means for the separate brakes at opposite sides of the tractor.

As best seen in Figs. 3, 5 and 7, the means for actuating the clutch C includes a supporting base 124 having its opposite ends so formed as to fit between the flange 84 of backing plate 71 and the primary brake disc 87 and act as spacers at these points, with a screw 85 extending through an opening in each end of the base 124 to secure the same in place. The base 124 projects outwardly from the housing and has a bored journal support 125 for a short rock-shaft 126 on one end of which is a lever 127 and on the other end of which is removably secured a hub 128 of a hand lever 129. On the hub 128 is a plug 130 which is adapted to abut with the base 124 when the clutch is engaged, and on the outer surface of the base 124 is a knob or protuberance 131 with which the lever 129 can abut when the lever is shifted to disengage the clutch.

For imparting a rocking movement to the clutch release arm 78, the latter is operatively interconnected with the release lever 127 by means of linkage 132, said linkage including a link 133 having one end 134 bent laterally and projecting through an opening in the end of lever 127, the other end of link 133 being screw-threaded and adjustably engaged in one end of a central adjuster link 135. In the other end of adjuster link 135 is a threaded end of a third link 136 which has its other end 137 bent laterally to project through an opening in the end of clutch release arm 78. The link 136 also has a jam nut 138 thereon which is utilized to lock the linkage in a selected adjusted position. The linkage 132 is preferably provided with means such as a washer 139 and key or pin 140 on at least one of its ends to lock the same in assembled relation with the arm 78 and the lever 127.

The brake B is adapted to be operated by means of a foot pedal 141 which operates to depress an arm 142 which extends beneath the transmission case 9 and forwardly thereof to a point where it is bent laterally at 143 for connection to one end of a rock-shaft 144 which is journaled in suitable supports 145 formed on or secured to the transmission case 9. The other end of the rock-shaft 144 has a lever 146 secured thereon and projecting laterally therefrom. Adjustable linkage 147 operatively connects the lever 146 to the arm 107 which is carried by the brake actuating ring 101, whereby depression of the pedal 141 will effect rotation of the rock-shaft 144 and consequent rotation of the brake actuator ring 101 so as to apply the brake B. This linkage 147 includes a hollow link 148 which is pivotally connected at one end to the outer end of arm 107, the other end of link 148 having a rod 149 threadedly engaged therein and adapted to be locked in a selected position by a jam nut 150 threaded on rod 149. Slidably mounted on rod 149, is a partly spherical member 151 which is engaged in a partly spherical recess 151′ in the lever 146 through which the rod 149 extends. A coiled spring 152 encircles the free end of the rod 149, said spring being interposed between member 151 and a washer 153 which is secured on the rod 149 by a nut 154. A nut 155 mounted on the rod 149 acts as a stop to limit movement of the member 151 away from washer 153 under the force of spring 152. Thus, it will be seen that actuating movements of the brake pedal 141 and lever 146 are cushioned by spring 152.

In order to seal the opening in housing 110 through which the brake-operating lever 107 projects, a pad 163 of suitable sealing material is fitted around the arm 107 so as to sealingly engage the outer face of the housing about the opening aforesaid. A plate 164 also fitting around the arm 107 overlies the pad 163 and a tapered coil spring 165 is interposed between the plate 164 and a pin 166 which extends through the arm 107, this spring 165 resiliently biasing the pad 163 into contact with the housing 110, while allowing the pad to slide on the housing surface upon movement of the arm 107.

The brake on countershaft 22 on the side of the tractor opposite brake B is adapted to be operated by a foot pedal 156 on the free end of an arm 157 which extends forwardly of the tractor beneath the transmission case 9. A rock-shaft 158 on which the arm 157 is rigidly mounted is rotatably supported in a pair of brackets or supports 159 which are formed on or attached to the transmission case 9, and mounted on the rock-shaft 158 is a crank lever 160 which is identical with the lever 146 on rock-shaft 144 which operates brake B, as has been previously described. Projecting from the housing 114 is an arm 161, and interconnecting this arm 161 with the lever 160 is a linkage assembly 162 which is identical with the linkage 147 which has been hereinbefore described in detail, and therefore linkage 162 need not be specifically described.

The operation of a tractor having the present invention applied thereto is as follows, assuming the main vehicle clutch 7 to be engaged, the clutch C to be engaged also, and the change-speed gearing to be engaged in a driving relationship.

Under the above conditions, the tractor will be moving forwardly and the power take-off 13 will be operating. If the operator desires to make a sharp turn, to reduce spinning of one tractor wheel caused by poor traction, or to retard rotation of one wheel or the other for any other reason, he will depress foot pedal 141 or foot pedal 156 or both, as the circumstances may require.

Assuming further that pedal 141 is depressed to retard rotation of the left-hand traction wheel 2, the rock-shaft 144 will be rotated so as to apply a downward pull on brake arm 107 of brake B, thus slightly rotating brake actuating ring 101, with the result that balls 104 will cam ring 101 away from flange 84 on plate 71 and thrust bearing 108 will transmit this movement to brake primary disc 92, so that the latter will shift brake disc 97 axially into engagement with the secondary brake disc 87. The brake disc 97, being mounted on the clutch power plate 44, will therefore retard rotation of the power plate 44 and consequently the hollow shaft 35 which is geared to the left-hand traction wheel. The primary brake disc 92, being slightly rotatable relative to the stationary flange 84, will tend to rotate with disc 92 responsive to drag torque, and as a consequence of this slight rotation of primary disc 92, the balls 94 will effect self-energization of the brake to supplement the braking effect created by mere depression of pedal 141. This self-energization provides increase braking power which is proportional to the drag torque of disc 92 or the left-hand traction wheel.

If it should be desired to brake the right-hand traction wheel 2, the foot pedal 156 is depressed, with attendant rocking of shaft 158. This will effect a pull on brake arm 161 through linkage 162, and this arm 161 will actuate the aforementioned toggle links so that the right-hand brake will be actuated in the manner described in the aforementioned prior patent. As a result of this brake operation, rotation of countershaft 22 will be retarded or stopped, with resultant retardation or stopping of the right-hand traction wheel 2.

Obviously, if only one of the pedals 141 or 156 is depressed to brake the traction wheel on one side only of the tractor, the traction wheel on the opposite side of the tractor will continue to be driven through the differential gear assembly. If desired, however, both pedals 141 and 156 may be depressed simultaneously to effect full braking of the tractor to retard its movement or stop the same.

In order to permit the tractor to stop and start, as may be required, without interrupting operation of the power take-off, the operator will shift the hand lever 129 forwardly until it engages the protuberance 131 on release lever supporting plate 124. Such movement of lever 129 releases the clutch C by shifting the release arm 78 in a clockwise direction as seen in Fig. 3, with attendant slight rotation of the clutch release ring 77 relative to the hub 72 on adapter plate 71, thus causing the balls 80 to cam the release ring 77 towards the primary clutch disc 48, and into engagement with the throw-out bearing 48'. Further movement of ring 77 in this direction will shift the primary disc 78 towards power plate 44 against the pressure of springs 67, and the shell 49 will shift the secondary clutch disc or pressure plate 51 away from power plate 44, thus releasing the frictional engagement of the clutch discs 54 and 55 and allowing the hub 56 and the discs 54 to continue rotation. This interruption of the drive between countershaft 19 and hollow shaft 35 also interrupts the drive from the differential to countershaft 22, because pinion 17 of the differential will merely ride around on beveled gear 24, without imparting any drive thereto.

To re-engage the clutch C so as to re-establish the drive to the traction wheels, the operator merely releases the hand lever 129 or pulls the same rearwardly, and the springs 67 will urge the primary disc 48 axially away from the power plate 44, with consequent shifting of the secondary disc 51 towards the power plate 44, thus establishing frictional engagement of the discs 54 and 55. The leaf springs 81 will maintain the clutch release ring 77 resiliently biased into socket 76 in hub 72 of backing plate 71.

When the discs 54 and 55 are packed between secondary disc 51 and power plate 44, driving torque will be imparted to the power plate 44 and to the hollow shaft 35, but any tendency of the power plate to lag behind the adjacent disc 54 will effect a powerful self-energization of the clutch by the balls 68. The intermediate disc 55 and the secondary disc 51, both being engaged with friction discs 54, will rotate along with and at the same speed as the countershaft 19 on which discs 54 are mounted, and the primary disc 48, being connected to discs 51 and 55 by the shell 49, will also rotate at the same speed as the countershaft 19. Accordingly, when the power plate tends to lag behind the adjacent disc 54, it also lags behind primary disc 48, with the result that the balls 68 will ride up the oppositely inclined faces of the camming inserts 70 and will positively supplement the clutch-engaging force of springs 69 with a powerful servo action which is proportional to the load on the clutch.

While the specific details have been hereinbefore described, this invention is not limited to such details alone, since changes and alterations may be resorted to without departing from the spirit of the invention, as defined in the appended claims; and while in the illustrated construction, countershaft 19 constitutes a power input shaft and hollow shaft 35 constitutes a power output shaft, where the terms "power input shaft" and "power output shaft" are used in the claims, it is to be understood that these terms are interchangeably applicable to the same elements, and it should also be understood that the terms "primary" and "secondary" as applied to the brake and clutch elements defined in the claims, are not intended to limit the claims to any particular construction or arrangement of these elements other than to indicate that the primary discs are those which are directly acted upon by the energizing balls or operating springs, while the secondary discs are those which are either acted upon by another friction disc or cause a reaction on the primary disc, regardless of whether the secondary disc is stationary or rotatable relative to the primary disc. In addition, the term "power plate" is intended to infer only that it is a plate upon which springs or balls may react to effect operation of a primary disc, and not necessarily that power in the nature of torque is transmitted through the power plate.

I claim:

1. A combined clutch and brake assembly, including a power input shaft and a power output shaft, cooperatively engageable clutch elements carried by the respective shafts, at least one of said clutch elements being mounted on said power output shaft for rotation therewith, brake means carried by at least one of said clutch elements for braking said clutch element on the power output shaft, and independent operating means for the clutch elements and for the brake means respectively for effecting selective engagement and disengagement of the clutch elements and brake means.

2. Apparatus as defined in claim 1, wherein said brake means includes a brake disc carried by the clutch element on the power output shaft.

3. Apparatus as defined in claim 1, including a backing plate adapted to be mounted on one of said shafts, means acting on said backing plate to operate said clutch elements, and means also acting on said backing plate to operate said brake means.

4. A combined clutch and brake assembly, including a power input shaft and a power output shaft, cooperatively engageable clutch elements carried by the respective shafts, at least one of said clutch elements being mounted on said power output shaft for rotation therewith, brake means carried by at least one of said clutch elements for braking said clutch element on the power output shaft, said brake means including a member to be braked, said member being shiftably mounted for axial movements on the clutch element on the power output shaft, a primary brake disc shiftably mounted at one side of said member for axial and rotative movements, a stationary brake disc mounted at the other side of said member, means for shifting said primary disc axially towards said stationary disc to engage the member to be braked therebetween, and self-energizing means operative on said primary disc to energize the brake means.

5. A combined clutch and brake assembly, including a power input shaft and a power output shaft, cooperatively engageable clutch elements carried by the respective shafts, at least one of said clutch elements being mounted on said power output shaft for rotation therewith, brake means carried by at least one of said clutch elements for braking said clutch element on the power output shaft, said brake means including a member to be braked, said member being shiftably mounted for axial movements on the clutch element on the power output shaft, a primary brake disc shiftably mounted at one side of said member for axial and rotative movements, a stationary brake disc mounted at the other side of said member, means for shifting said primary disc axially towards said stationary disc to engage the member to be braked therebetween, said shifting means including an operating member rotatably mounted on said primary disc, camming means operative on said operating member to shift the operating member and the primary disc axially responsive to rotation of the operating member, and means operative on said operating member to rotate the same.

6. A combined clutch and brake assembly, including a power input shaft and a power output shaft, cooperatively engageable clutch elements carried by the respective shafts, at least one of said clutch elements being mounted on said power output shaft for rotation therewith, brake means carried by at least one of said clutch elements for braking said clutch element on the power output shaft, said brake means including a member to be braked, said member being shiftably mounted for axial movements on the clutch element on the power output shaft, a primary brake disc shiftably mounted at one side of said member for axial and rotative movements, a stationary brake disc mounted at the other side of said member, means for shifting said primary disc axially towards said stationary disc to engage the member to be braked therebetween, and self-energizing means operative on said primary disc to energize the brake means, said self-energizing means including a stationary part and camming elements interposed between said stationary part and a portion of said primary disc for shifting said primary disc axially towards the stationary disc aforesaid responsive to slight rotation of said primary disc relative to said stationary part.

7. A combined clutch and brake assembly, including a power input shaft and a power output shaft, cooperatively engageable clutch elements carried by the respective shafts, at least one of said clutch elements being mounted on said power output shaft for rotation therewith, brake means carried by at least one of said clutch elements for braking said clutch element on the power output shaft, the clutch element mounted on the power output shaft constituting a power plate, another of said clutch elements constituting a primary actuating disc shiftably mounted at one side of said power plate for axial and rotative movement relative to the power plate, another of said clutch elements constituting a shiftable pressure plate mounted at the opposite side of said power plate from said primary disc, and at least one of said clutch elements being in the form of a friction disc disposed between said power plate and said pressure plate and slidably connected to the power input shaft for rotation therewith, means rigidly connecting said pressure plate to said primary disc, means for shifting said primary disc away from said power plate to effect engagement of said friction disc between said pressure plate and said power plate, and means for shifting said primary disc toward said power plate.

8. A combined clutch and brake assembly, including a power input shaft and a power output shaft, cooperatively engageable clutch elements carried by the respective shafts, at least one of said clutch elements being mounted on said power output shaft for rotation therewith, brake means carried by at least one of said clutch elements for braking said clutch element on the power output shaft, the clutch element mounted on the power output shaft constituting a power plate, another of said clutch elements constituting a primary actuating disc shiftably mounted at one side of said power plate for axial and rotative movement relative to the power plate, another of said clutch elements constituting a shiftable pressure plate mounted at the opposite side of said power plate from said primary disc, and at least one of said clutch elements being in the form of a friction disc disposed between said power plate and said pressure plate and slidably connected to the power input shaft for rotation therewith, means rigidly connecting said pressure plate to said primary disc, means for shifting said primary disc away from said power plate to effect engagement of said friction disc between said pressure plate and said power plate, and means for shifting said primary disc toward said power plate, the means for shifting said primary disc away from said power plate including resilient means interposed between said primary disc and said power plate.

9. A combined clutch and brake assembly, including a power input shaft and a power output shaft, cooperatively engageable clutch elements carried by the respective shafts, at least one of said clutch elements being mounted on said power output shaft for rotation therewith, brake means carried by at least one of said clutch elements for braking said clutch element on the power output shaft, the clutch element mounted on the power output shaft constituting a power plate, another of said clutch elements constituting a primary actuating disc shiftably mounted at one side of said power plate for axial and rotative movement relative to the power plate, another of said clutch elements constituting a shiftable pressure plate mounted at the opposite side of said power plate from said primary disc, and at least one of said clutch elements being in the form of a friction disc disposed between said power plate and said pressure plate and slidably connected to the power input shaft for rotation therewith, means rigidly connecting said pressure plate to said primary disc, means for shifting said primary disc away from said power plate to effect engagement of said friction disc between said pressure plate and said power plate, and means for shifting said primary disc toward said power plate, the means for shifting said primary disc away from said power plate including camming means interposed between said primary disc and said power plate and engaged therewith for shifting said primary disc axially upon rotation of the latter relative to said power plate.

10. A combined clutch and brake assembly, including a power input shaft and a power output shaft, cooperatively engageable clutch elements carried by the respective shafts, at least one of said clutch elements being mounted on said power output shaft for rotation therewith, brake means carried by at least one of said clutch elements for braking said clutch element on the power output shaft, the clutch element mounted on the power output shaft constituting a power plate, another of said clutch elements constituting a primary actuating disc shiftably mounted at one side of said power plate for axial and rotative movement relative to the power plate, another of said clutch elements constituting a shiftable pressure plate mounted at the opposite side of said power plate from said primary disc, and at least one of said clutch elements being in the form of a friction disc disposed between said power plate and said pressure plate and slidably connected to the power input shaft for rotation therewith, means rigidly connecting said pressure plate to said primary disc, means for shifting said primary disc away from said power plate to effect engagement of said friction disc between said pressure plate and said power plate, and means for shifting said primary disc toward said power plate, the means for shifting said primary disc toward said power plate including an operating member shiftably mounted adjacent to said primary disc for axial and rotative movements, camming means operative on said operating member to shift the same axially responsive to rotation thereof, and means for shifting said operating member rotatively.

11. A combined clutch and brake assembly including a rotary power input shaft, a rotary power output shaft, a clutch power plate fixed on said power output shaft for rotation therewith, friction clutch means carried by said power input shaft and engageable with said power plate to effect rotation of both of said shafts, means for effecting engagement and disengagement of said friction clutch means and said power plate, a brake disc mounted on said power plate for rotation therewith, brake means engageable with said brake disc to brake the power plate aforesaid, and separate operating means operatively engaged with said brake means for effecting engagement and disengagement of said brake disc and said brake means independently of the condition of said clutch means.

12. A combined clutch and brake assembly including a rotary power input shaft, a rotary power output shaft, a clutch power plate fixed on said power output shaft for rotation therewith, friction clutch means carried by said power input shaft and engageable with said power plate to effect rotation of both of said shafts, means for effecting engagement and disengagement of said friction clutch means and said power plate, a brake disc mounted on said power plate for rotation therewith, brake means engageable with said brake disc to brake the power plate aforesaid, and means for effecting engagement and disengagement of said brake disc and said brake means, said clutch engaging and disengaging means including a shell in which said power plate is disposed, said shell having openings therethrough, said power plate having projections thereon extending through the openings in said shell, and said brake disc being mounted on said projections exteriorly of said shell.

13. A combined clutch and brake assembly including a rotary power input shaft, a rotary power output shaft, a clutch power plate fixed on said power output shaft for rotation therewith, friction clutch means carried by said power input shaft and engageable with said power plate to effect rotation of both of said shafts, means for effecting engagement and disengagement of said friction clutch means and said power plate, a brake disc mounted on said power plate for rotation therewith, brake means engageable with said brake disc to brake the power plate aforesaid, and means for effecting engagement and disengagement of said brake disc and said brake means, said clutch engaging and disengaging means including a primary actuating disc shiftably mounted at one side of said power plate for axial and rotative shifting movements, a secondary clutch disc disposed at the other side of said power plate, a shell fixed at one end to said primary disc and fixed at its other end to said secondary disc, at least one friction disc carried by said power input shaft for rotation therewith and interposed between said secondary disc and said power plate, said primary disc, said shell and said secondary disc being shiftable axially to effect engagement of the friction disc between the secondary disc and the power plate and disengagement thereof, said shell having a longitudinally extended opening therethrough, said power plate having a lug projecting through said opening, and said brake disc being mounted on the lug on said power plate.

14. A combined clutch and brake assembly, comprising a backing plate adapted to be mounted on a stationary support, said backing plate having a central opening therethrough, a first rotatable shaft extending through said opening, a clutch power plate fixed on said shaft for rotation therewith, clutch actuating means including a primary disc shiftably interposed between said power plate and said backing plate, a second rotatable shaft, friction disc means mounted on said second shaft for rotation therewith, means carried by said primary disc for effecting engagement of said friction disc means with said power plate responsive to shifting movement of said primary disc towards said backing plate, means for effecting such shifting movement of the primary disc, clutch-operating means interposed between said primary disc and said backing plate to shift the primary disc away from said backing plate for effecting disengagement of said friction disc means and said power plate, a stationary brake disc, means supporting said brake disc in spaced relation to said backing plate, a primary brake disc shiftably interposed between said backing plate and said stationary brake disc, brake-actuating means interposed between said backing plate and said primary brake disc for shifting the primary disc towards said stationary disc, and a friction brake disc mounted on said clutch power plate and interposed between said primary and stationary brake discs and engageable therewith to brake the friction brake disc and therefore the clutch power plate and the shaft on which it is fixed.

15. Apparatus as defined in claim 14, including a housing secured to the backing plate and encompassing said clutch and brake assembly, the clutch-operating means aforesaid including a rotatable and axially shiftable member, camming elements interposed between said member and the backing plate to cam the member axially responsive to rotation thereof, an arm projecting from said member and extending exteriorly of said housing, and means for rocking said arm to effect rotation of said member.

16. Apparatus as defined in claim 14, including a housing secured to the backing plate and encompassing said clutch and brake assembly, the brake-actuating means including a rotatably and axially shiftable member, camming elements interposed between said member and the backing plate to cam the member axially responsive to rotation thereof, an arm projecting from said member and extending exteriorly of said housing, and means for rocking said arm to effect rotation of said member.

17. A friction clutch of the class described, comprising a power input shaft, a power output shaft, a clutch plate rigidly mounted on one of said shafts for rotation therewith, a primary clutch disc shiftably disposed at one side of said clutch plate, a secondary clutch disc shiftably disposed at the other side of said clutch plate, means supporting said secondary disc on said primary disc, a pack of friction discs interposed between said secondary disc and said clutch plate and shiftably mounted on the other shaft for rotation therewith, clutch-engaging means for shifting said primary disc away from said clutch plate to pack the friction discs between said secondary disc and said clutch plate, and means shiftably and directly supporting said secondary disc on one of said shafts for eliminating squeal when the clutch is being engaged.

18. A friction clutch as defined in claim 17, wherein the squeal-eliminating means includes an annular plate, said annular plate being slidably mounted at its center on one of said shafts and the outer marginal edge of said annular plate being secured to said secondary disc, 19. A friction device as defined in claim 17, wherein the squeal-eliminating means includes an anti-friction bearing mounted on one of said shafts, and a rigid supporting element slidably mounted on said bearing and rigidly connected to said secondary disc.

References Cited in the file of this patent

UNITED STATES PATENTS

| Number | Name | Date |
|---|---|---|
| 1,189,368 | Link | July 4, 1916 |
| 1,440,341 | Crispen | Dec. 26, 1922 |
| 2,333,980 | Branson | Nov. 9, 1943 |
| 2,418,019 | Fast | Mar. 25, 1947 |
| 2,526,143 | Lambert | Oct. 17, 1950 |
| 2,589,830 | Lewin | Mar. 18, 1952 |
| 2,591,873 | Risk | Apr. 8, 1952 |
| 2,636,581 | Bitler | Apr. 28, 1953 |
| 2,667,248 | Wissman | Jan. 26, 1954 |
| 2,679,769 | Parrett | June 1, 1954 |